(12) United States Patent
Shafaat et al.

(10) Patent No.: US 7,808,377 B2
(45) Date of Patent: Oct. 5, 2010

(54) DIRECT AIRCRAFT-TO-AIRCRAFT DATA LINK COMMUNICATION

(75) Inventors: Syed Tahir Shafaat, Everett, WA (US); John Allin Brown, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 445 days.

(21) Appl. No.: 11/858,011

(22) Filed: Sep. 19, 2007

(65) Prior Publication Data

US 2009/0134981 A1     May 28, 2009

(51) Int. Cl.
- G08B 29/00 (2006.01)
- G08G 5/04 (2006.01)
- H04W 4/00 (2009.01)

(52) U.S. Cl. .................. 340/506; 340/961; 340/973; 340/981; 455/98; 455/431; 701/3

(58) Field of Classification Search .................. 340/506, 340/961, 973, 981; 455/98, 431
See application file for complete search history.

(56) References Cited

U.S. PATENT DOCUMENTS

| | | | |
|---|---|---|---|
| 4,188,630 A | 2/1980 | Milosevic | |
| 5,181,027 A | 1/1993 | Shafer | |
| 6,977,608 B1 * | 12/2005 | Anderson et al. | 342/26 B |
| 7,212,918 B2 * | 5/2007 | Werback | 701/120 |
| 7,463,955 B1 * | 12/2008 | Robinson et al. | 701/3 |
| 2006/0167618 A1 | 7/2006 | Werback | |
| 2007/0222665 A1 * | 9/2007 | Koeneman | 342/29 |

OTHER PUBLICATIONS

Mohleji et al., "Future vision of globally harmonized national airspace system with concepts of operations beyond year 2020", 22nd, DASC, The 22nd. Digital Avionics Systems Conference Proceedings, Indianapolis, IN, Oct. 12-16, 2003, 14 pages.
Chang et al., "Emerging cockpit technologies for free flight: situational awareness for safety, automatic dependent surveillance-broadcast, air-to-air data link, and weatherlink", Air Traffic Control Technologies II 10-11, vol. 2737, Apr. 1996, 17 pages.

* cited by examiner

Primary Examiner—Donnie L Crosland
(74) Attorney, Agent, or Firm—Haynes and Boone, LLP.

(57) ABSTRACT

Systems and methods for direct communication between aircraft for one or more embodiments are adapted to receive tactical and strategic information related to proximate aircraft for improved flight planning. The systems and methods presented herein may be implemented, for example, in a first aircraft having a data link component adapted to process information, a storage component adapted to store information related to the first aircraft, and a communication interface component adapted to directly communicate with a second aircraft via a communication link. The first aircraft may include a user interface component adapted to interact with the data link component to retrieve information related to the first aircraft from the storage component, generate a request message with the information related to the first aircraft, and communicate with the communication interface component to directly transmit the generated request message to the second aircraft via the communication link.

20 Claims, 5 Drawing Sheets

DIRECT AIRCRAFT-TO-AIRCRAFT DATA LINK COMMUNICATION

TECHNICAL FIELD

The present disclosure relates generally to avionics and, in particular, to direct aircraft-to-aircraft communication.

BACKGROUND

Avionics generally refers to aviation electronics, which includes electronic systems for use on an aircraft, such as an aircraft communication system. In general, conventional aircraft do not directly communicate with each other due to a lack of information (e.g., flight identification and location) about other aircraft available to the flight crew, and the flight crew typically has no direct knowledge of aircraft in their general vicinity. Sometimes, conventional aircraft indirectly communicate with other aircraft via a transmission relay from a ground-based position, such as an air traffic controller, but this is often an inefficient way to communicate.

In general, conventional aircraft communication systems are deficient in reference to direct communication between aircraft. As a result, there is a need for improved communication between aircraft, such as, for example, for better flight planning.

SUMMARY

As described herein, embodiments of the disclosure provide systems and methods for aircraft-to-aircraft direct communication, such as between commercial airplanes and/or military airplanes, which may involve receiving tactical and strategic information from proximate aircraft that may affect the requesting aircraft and may be used for improved flight planning. For example, an aircraft may be adapted to identify and select another aircraft of interest from proximate in-flight traffic and directly communicate therewith by transmitting messages to the selected aircraft and/or receiving messages from the selected aircraft. In various implementations, the transmitted and/or received messages may include text messages.

In accordance with one embodiment, a system for a first aircraft includes a data link component adapted to process information, a storage component adapted to store information related to the first aircraft, and a communication interface component adapted to directly communicate with a second aircraft via a communication link. A user interface component is adapted to interact with the data link component to retrieve the information related to the first aircraft from the storage component, generate a request message with the information related to the first aircraft, and communicate with the communication interface component to directly transmit the generated request message to the second aircraft via the communication link.

In accordance with one embodiment, a method adapted for use by a first aircraft includes identifying and selecting a second aircraft for communication therewith, transmitting a request for information directly to the second aircraft via a communication link, receiving the requested information directly from the second aircraft via one or more communication links, and incorporating information received from the second aircraft into situational awareness displays and into other avionics functions. The method may include storing the information received from the second aircraft in a storage component and generating an alternate flight plan based on the information received from the second aircraft. In various implementations, the request link and the response link may comprise a single communication link, or the request link and the response link may comprise separate links.

In accordance with one embodiment, software may be encoded in one or more computer readable media, and when executed, the software may be operable to provide a first aircraft the capability to communicate with a second aircraft. The software may be operable to identify and select the second aircraft for communication therewith, transmit a request for information directly to the second aircraft via a communication link, and receive the requested information directly from the second aircraft via the communication link. The software may be operable to store the information received from the second aircraft. The software may be operable to generate an alternate flight plan based on the information received from the second aircraft. The software may be operable to transmit a message (e.g., a text message) to the second aircraft as the request for information and to receive a message (e.g., a text message) from the second aircraft as a response to the request for information.

The scope of the disclosure is defined by the claims, which are incorporated into this section by reference. A more complete understanding of embodiments will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments and their advantages are best understood by referring to the detailed description that follows. It should be appreciated that like reference numerals are used to identify like elements illustrated in one or more of the figures.

DETAILED DESCRIPTION

In accordance with embodiments of the present disclosure, systems and methods disclosed herein provide for direct communication between aircraft, such as between commercial airplanes and/or military airplanes, which may involve transmitting and receiving tactical and strategic information of other in-flight proximate aircraft for improved flight planning. The systems and methods disclosed herein obtain in-flight information from proximate aircraft including flight identity, direction of the traffic, altitude, etc. in the flight deck via a crew interface component and messaging capabilities including text messaging. The systems and methods disclosed herein use the traffic information display function to enable the flight crew to identify a suitably-positioned aircraft and address it with a request message.

The systems and methods presented herein allow a flight crew to identify and select an aircraft of interest from proximate in-flight traffic and transmit and/or receive messages requesting information. In various implementations, the systems and methods disclosed herein may be adapted for direct communication between aircraft.

Figure 1A:
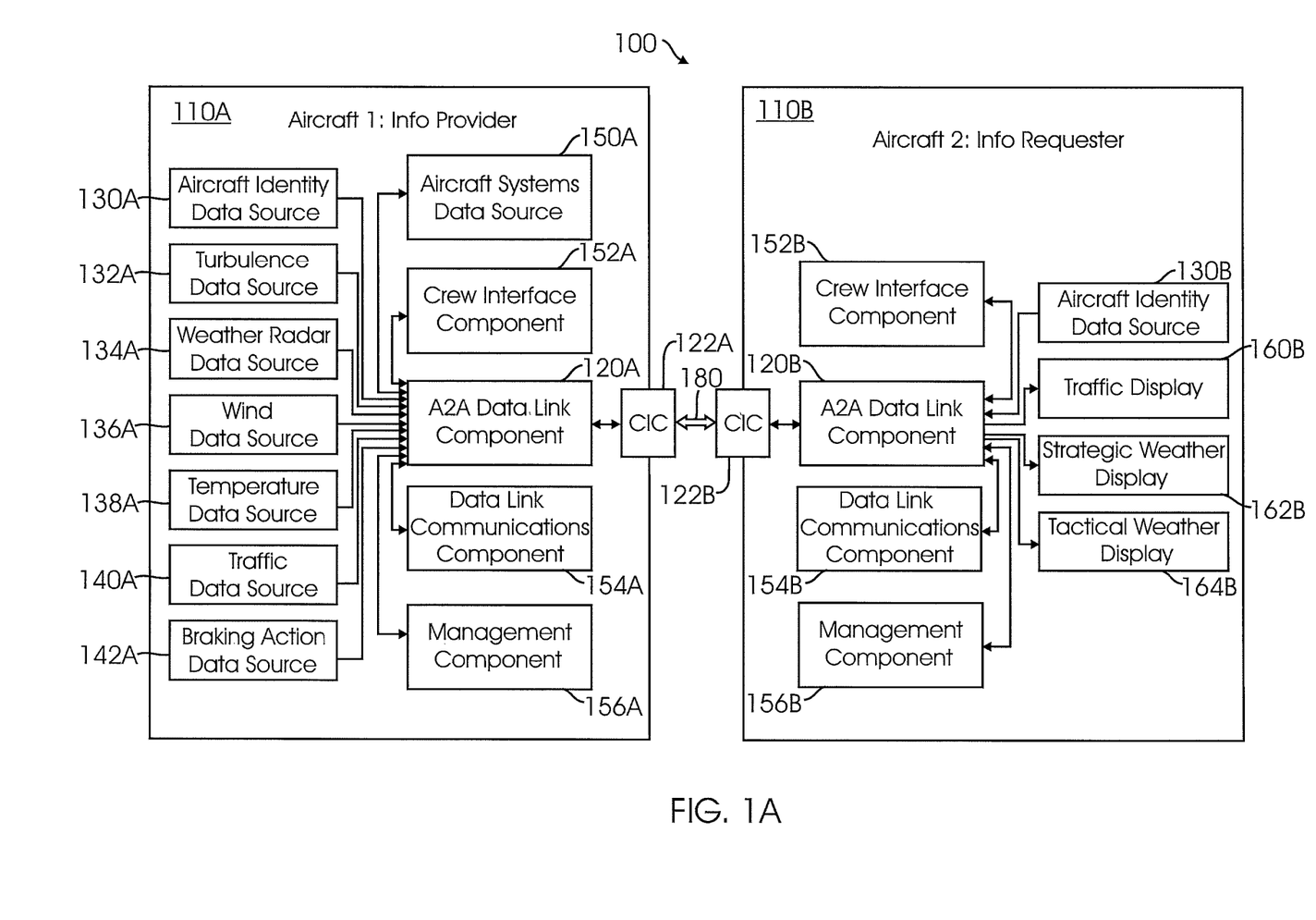
FIGS. 1A-1B show various embodiments of an aircraft-to-aircraft communication system.

FIG. 1A shows a system 100 for direct aircraft-to-aircraft (A2A) communication in accordance with one embodiment of the present disclosure. The system 100 comprises a first aircraft 110A in communication with a second aircraft 110B via a communication link 180. In one embodiment, the communication link 180 comprises a radio frequency (RF) link, such as a two-way link, a one-way request/response link and/or a plurality of one-way response/request links, which is described in greater detail herein.

In one embodiment, the first aircraft 110A comprises an A2A data link component 120A and a communication interface component (CIC) 122A. The A2A data link component 120A comprises an avionics communication and processing unit that is adapted to exchange information with other aircraft via the CIC 122A (e.g., a wireless transceiver adapted for use with one or more radio frequencies) and communication link 180. In one implementation, the A2A data link component 120A is adapted to process information transmitted to another aircraft as a request message and to process information received from another aircraft as a response message. In various implementations, A2A data link component 120A utilizes RF transmitters and receivers in CIC 122A to digitally transmit and receive encoded digital data.

In one embodiment, the CIC 122A comprises a radio frequency (RF) receiver and/or transmitter device that is adapted for wireless communication between aircraft. In another embodiment, the CIC 122A may comprise a transceiver that is adapted to transmit and receive wireless communication between aircraft. As previously discussed, the communication link 180 may comprise an RF link for direct one-way or two-way communication between aircraft. In various implementations, use of radio frequency bands Automatic Dependent Surveillance—Broadcast (ADS-B), Automatic Dependent Surveillance—Contract (ADS-C), High Frequency (HF), Very-High Frequency (VHF), and Ultra-High Frequency (UHF) may be adapted to enable direct communication between aircraft.

In general, the ADS-B aircraft function gathers data from various aircraft systems and forms messages that are transmitted over a period of time, such as every half of a second. The data transmitted may include horizontal position, altitude, speed, track, flight identification, aircraft size, data quality indicators and various other data. The data variety may continue to increase and/or change as the industry learns better uses for the function. In one example, broadcasts may be made over a line-of-sight link limiting reception range to perhaps 200 to 300 miles. In other examples, digital considerations may limit the range.

In general, the ADS-C aircraft function gathers data from various aircraft systems and transmits the gathered data over a beyond-line-of-sight medium (e.g., satellite communication or HF radio). In the case of ADS-C, inter-transmission time may be much greater (usually between 1 minute and 40 minutes) than ADS-B, and the range of data that is transmitted may be richer. In one aspect, the term 'contract' is used because the receiving system sets up a contract with the transmitting aircraft to transmit either to a schedule (i.e., periodically) or when an event occurs (e.g., when a specific point is passed).

In one embodiment, a plurality of data sources 130A, 132A, 134A, 136A, 138A, 140A, 142A, 150A are connected to the A2A data link component 120A for communication therewith. The data sources provide various types of data and information to the A2A data link component 120A for inclusion in a message for transmission to another aircraft.

The data sources may include an aircraft identity data source 130A, such as a storage device, that may be adapted to store and provide relevant information about the first aircraft 110A including origin of the aircraft, type of the aircraft, manufacturer of the aircraft, license information, flight crew information, passenger information, departure information, arrival information, flight route and other relevant information. In one example, the aircraft identity information may be in the form of the flight number and/or the tail number. In other examples, the aircraft identity information may include one or more parameters including aircraft type, aircraft manufacturer, aircraft license, flight crew, passenger, origin and destination.

In one embodiment, the aircraft identity data source 130A may comprise a specific component in the aircraft that is configured to hold the flight identity of the aircraft for a particular flight. The identity (i.e., identification) of the aircraft is passed to the ADS-B function for broadcast. In one implementation, the requesting aircraft uses the identity data and information to address its requests. In one embodiment, the source of aircraft identity data is in the flight management function.

The data sources may include a turbulence data source 132A, such as a turbulence measurement device and recorder, that may be adapted to obtain, store and provide relevant information regarding turbulence encountered during flight including turbulence force and direction along with information related to location and altitude of the aircraft during each measurement. The turbulence information generated during measurement may include one or more parameters including force, direction, time, date, location, altitude and frequency of each turbulence measurement.

In one embodiment, the turbulence data source 132A provides turbulence data as part of weather data and information that an aircraft may transmit when requested. In various implementations, sources may include accelerometers in the inertial reference systems, wherein the accelerometers are configured to detect variations in vertical acceleration and, in some instances, may include angle of attack values occasioned by flight in rough air conditions. The turbulence data and information may be requested and received from one or more other aircraft to provide a more detailed picture of ride quality and, in some cases, hazards.

The data sources may include a weather radar data source 134A, such as a weather radar device and recorder, that may be adapted to obtain, store and provide relevant information about weather and other environmental conditions encountered during flight including information related to location and altitude of the aircraft during each measurement. The weather radar information generated during measurement may include one or more parameters including time, date, location, altitude and frequency of each measurement. In one embodiment, the weather radar data source 134A may comprise a weather radar that is located in the nose of the aircraft, which is adapted to transmit RF energy in an arc ahead of the aircraft and detect the energy that is reflected from particles in the atmosphere like rain, dust, ice, etc.

The data sources may include a wind data source 136A, such as a wind measurement device and recorder, that may be adapted to obtain, store and provide relevant information about wind encountered during flight including wind speed and wind direction along with information related to location and altitude of the aircraft during each measurement. The wind information generated during measurement may include one or more parameters including speed, direction, time, date, location, altitude and frequency of each wind measurement.

In one embodiment, the wind data source 136A may comprise various systems in the aircraft that are adapted to measure the wind velocity or infer the value from true airspeed, speed relative to the ground, angle of progress through the air (heading), and angle of progress across the ground (track).

This combination of data and information allows wind velocity (i.e., direction and strength) to be extracted. An aircraft can only detect wind values in its current location, but needs wind data from positions along its intended track to refine the predictability of its progress. Hence, this data and information may be requested from another aircraft ahead so that predictions may be refined.

The data sources may include a temperature data source 138A, such as a temperature measurement device and recorder, that may be adapted to obtain, store and provide relevant information about temperature encountered during flight along with information related to location and altitude of the aircraft during each measurement. The temperature information generated during measurement may include one or more parameters including temperature value, time, date, location, altitude and frequency of each temperature measurement. The temperature information may also include information related to icing conditions.

In one embodiment, the temperature data source 138A may comprise one or more temperature sensors. In general, air temperature is an important parameter in refining flight progress predictions. Similar to wind, temperature may only be sensed in the current position of the aircraft, and temperature values ahead are important to its navigation functions. Thus, air temperature data and information may be requested from an aircraft ahead.

The data sources may include a traffic data source 140A, such as a traffic detection device and recorder, that may be adapted to obtain, store and provide relevant information about aircraft traffic encountered during flight including flight identification, speed, altitude and direction of other aircraft encountered during flight along with information related to location and altitude of the present aircraft during each measurement. The traffic information generated during measurement may include one or more parameters including flight identification, speed, direction, time, date, location, altitude and frequency of each traffic measurement. In one embodiment, the traffic data source 140A may comprise the ADS-B, which allows positional, velocity vector, identification and other information to be broadcast for use by ground functions and other aircraft. In some implementations, this may be a main source of traffic data to the transmitting aircraft and of proximate traffic to the requesting aircraft. Another source of traffic data may be ground facilities that send similar data derived from other forms of surveillance, such as ground radar systems. As such, the requesting aircraft may extend its surveillance range by requesting traffic data from other aircraft.

The data sources may include a braking action data source 142A, such as a braking action measurement device and recorder, that may be adapted to obtain, store and provide relevant information about braking action during landing including information related to location of the aircraft relative to the identified runway during each measurement. The braking action information generated during measurement may include one or more parameters including time, runway designation, date, location on runway, and frequency of each measurement. In one embodiment, when an aircraft lands, the relationship between its deceleration and braking effort applied may be used to derive a friction value for the runway surface. This computation may be carried out in the flight management function or in a separate avionics function. This data may be requested by another aircraft about to land on the same runway to ensure that the runway is long enough and to refine its estimate of the taxiway to be used to turn off the runway.

In one embodiment, an aircraft systems data source 150A is connected to the A2A data link component 120A for communication therewith. In general, aircraft systems (e.g., engines, flight controls, etc.) are monitored for signs of wear and/or latent failure, and during operation, aircraft systems data are transmitted directly to ground stations for use by a maintenance organization of the aircraft operator. If the aircraft providing data, such as the first aircraft 110A, is beyond range of the ground station (e.g., during offshore operations) but another aircraft, such as the second aircraft 110B, is within range of both the first aircraft 110A and the ground facility, aircraft systems data provided by the aircraft systems data source 150A may be passed to the ground facility via the second aircraft 110B.

In one embodiment, the aircraft systems data source 150A may comprise a database or some other form of memory device for gathering and storing data and information, including aircraft systems data and measurement data, from the data sources of the first aircraft 110A. The A2A data link component 120A may be adapted to access and obtain the stored data and information from the aircraft systems data source 150A to include in a request message and/or response message for transmission to another aircraft.

In one embodiment, a crew interface component 152A is connected to the A2A data link component 120A for communication therewith. The crew interface component 152A comprises a control and display unit that allows the flight crew to interact with the A2A data link component 120A. The crew interface component 152A may include a user interface, such as graphical user interface (GUI), to write and read messages, such as text messages. As such, requested information may be provided in a request message (e.g., request text message) from a menu of predetermined request messages. In one implementation, the response message (e.g., response text message) may be from an automated system or from the flight crew of the other aircraft. It should be appreciated that the flight crew of the other aircraft has the ability to accept and/or reject incoming messages from other aircraft. In various implementations, messages may be selected from lists and/or typed into the crew interface component 152A, and the receiving aircraft flight crew is able to read the messages on the crew interface component of the receiving aircraft and/or transfer the data to avionics systems for functional use. The transmitting flight crew may also select the data requested from the list of data available for transmission.

In one implementation, the crew interface component 152A may comprise a graphics display system (e.g., GUI) connected to the aircraft communication avionics unit (e.g., A2A data link component 120A) that is provided for displaying proximate aircraft traffic information. A cockpit user interface (e.g., pointer, touch screen, voice command or ability to select an aircraft from an electronic list of nearby traffic) may be connected to the graphics display system for selecting an aircraft of interest (e.g., proximate aircraft traffic) on the graphics display. In one implementation, the crew interface component 152A may comprise a cockpit device for entering and/or initiating messages (e.g., text messages) addressed to the selected aircraft and for displaying received data and information from the selected aircraft.

In one embodiment, the systems and methods provided herein disclose wireless aircraft-to-aircraft (A2A) communication, including text communication, for tactical flight planning and to improve situational awareness with other in-flight proximate aircraft. The systems and methods disclosed herein enable flight crews to use identity information associated with other proximate aircraft of interest from a traffic display and select the aircraft of interest from a list of current proximate aircraft traffic using, for example, a CDU, a cursor control device, a touch screen, or voice command. After selecting an aircraft of interest, the flight crew may send (i.e., transmit) a message requesting tactical information for improved flight planning or some other purpose. The message may be transmitted on HF, VHF, ADS-B (i.e., as part of the broadcast data stream to the selected aircraft), ADS-C or any other generally known or new wireless transmission link, medium, frequency, etc.

In one embodiment, a data link communications component 154A is connected to the A2A data link component 120A for communication therewith. The component 154A may be configured as a company data link communications function that allows data to be exchanged between an aircraft and an operating authority of the aircraft. For example, a flight operations control center (FOCC) accommodates the communications function on the ground. From the FOCC, data and information may be disseminated to other aircraft organizations, such as maintenance, hoteling, scheduling, and meteorology. Similarly, these organizations may pass data and information to or request data from the aircraft. Data transmission from the aircraft over this link may be automated or manual by, for example, the flight crew.

In one embodiment, a management component 156A is connected to the A2A data link component 120A for communication therewith. The component 156A may be configured as a flight management function that provides flight crew members with navigational and aircraft performance-based data and information that enables them to operate the aircraft to a desired level of performance and efficiency. The flight management function sends data to flight instruments in the aircraft and to automatic flight functions to allow the aircraft to be guided along its route in three or four dimensions. In various implementations, the flight management function serves as a source of a variety of navigational data, including experienced winds and outside air temperatures, and aircraft performance related data and information. The flight management function in the requesting aircraft may accept data and information from the transmitting aircraft to thereby allow updating of its navigation and performance functions.

In one embodiment, the second aircraft 110B comprises an A2A data link component 120B and a communication interface component (CIC) 122B. In various implementations, the A2A data link component 120B and the CIC 122B of second aircraft 110B function in a similar manner as with the A2A data link component 120A and the CIC 122A of first aircraft 110A.

In one embodiment, an aircraft identity data source 130B is connected to the A2A data link component 120B for communication therewith. The aircraft identity data source 130B, such as a storage device, may be adapted to store and provide relevant information about the second aircraft 110B. The aircraft identity information may include one or more parameters including aircraft type, aircraft manufacturer, aircraft license, flight crew, passenger, origin and destination. In one implementation, the second aircraft 110B (i.e., the requesting aircraft) provides identify information to the first aircraft (i.e., the responding aircraft) so that the identity information may be used as an address for transmitting a response message. In other words, the use of the requesting aircraft identification is to provide an address for the transmitting aircraft to respond to.

In one embodiment, a plurality of display components 160B, 162B, 164B are connected to the A2A data link component 120B for communication therewith. The display components 160B, 162B, 164B have functionality as follows.

The display components may include a traffic display component 160B, which is adapted to display traffic information in the flight deck under the control of, for example, the crew interface component 152B. In one embodiment, the traffic display component 160B is adapted to function as an enabler to the request function, wherein the requesting aircraft knows the position and identity of other proximate aircraft. In various implementations, aircraft may broadcast data and information including positional, velocity vector, identification and other information for use by ground functions and other aircraft. In a receiving aircraft, the data may be displayed on a traffic display that may be integrated with, for example, a tactical weather display. The traffic display component 160B allows the requesting aircraft, such as the second aircraft 110B, to identify another aircraft, such as the first aircraft 110A, to which the request is addressed. As such, the second aircraft 110B may request traffic data from the first aircraft 110A to allow extended range capability in the traffic display 160B of the requesting second aircraft 110B. In various implementations, the traffic display component 160B may be configured for CDTI, ADS-B and/or ADS-C.

In general, CDTI (Cockpit Display of Traffic Information) is a display system that present surveillance information about surrounding air traffic to a flight crew. The information presented includes relative positions of other proximate aircraft and traffic information related thereto (e.g., altitude, ground speed, etc.) for air traffic awareness. In various implementations, systems and methods presented herein use the traffic information of the CDTI to enable the flight crew to identify a suitably-positioned aircraft and address it with a request message.

The display components may include a strategic weather display component 162B. In some instances, operators may allow flight crews latitude in decision-making processes in reference to conduct of a flight. As such, the flight crews may be provided with down-route weather information for display on a strategic weather display that allows the flight crew to make decisions about the flight conduct in one or more hours ahead. Such information may allow the flight crew to make better-informed decisions concerning gate-to-gate operation than otherwise might be made. For example, if the transmitting aircraft is 300 miles ahead and sees an additional 250 miles ahead with its weather radar, then the data that may be transmitted is strategic in terms of the operation of the requesting aircraft. In another example, the transmitting aircraft may have access to other weather data sources not yet available to the requesting aircraft either through differences in equipage or through system unserviceability. Hence, in this instance, the flight crew of the requesting aircraft may request any relevant and available data and information to be transmitted for display on the strategic weather display.

The display components may include a tactical weather display component 164B. In one implementation, the second aircraft 110B may have a weather display that is fed by a radar mounted in the nose of the second aircraft 110B. The display of weather-related phenomena (e.g., areas of rain, turbulence, etc.) allows the flight crew to avoid hazardous weather. In some instances, radar suffers from shadow effects in which weather that lies beyond a severe storm may not be seen because the radar may not be able to see through rain effectively. To counter some negative effects, radar data and information along with other weather-related data and information (e.g., experienced turbulence) may be transmitted to the requesting aircraft to allow a more capable weather picture to be produced on the tactical weather display to thereby allow the flight crew to make better-informed decisions about weather-avoidance measures.

In one embodiment, a crew interface component 152B, a data link communications component 154B, and a management component 156B are connected to the A2A data link component 120B for communication therewith. In one embodiment, these components 152B, 154B, 156B may be equipped with similar scope and functionality as their respective counterparts 152A, 154A, 156A. In other embodiments, the crew interface component 152B is used by the flight crew to request data and review responses, the data link communications component 154B is used for onward transmission of received data to the operator's operational control system on the ground, and the management component 156B uses the received data to ensure performance and economy in the conduct of the flight.

Referring to FIG. 1A, the first aircraft 110A may function as a data provider, and the second aircraft 110B may function as a data requestor and utilizer. As such, in one implementation, the second aircraft 110B (i.e., data requestor) may generate and directly transmit an A2A request message for in-flight information to the first aircraft 110A (i.e., data provider) via the communication link 180. After receiving the request message, the first aircraft 110A may generate the requested in-flight information and directly transmit an A2A response message having the requested in-flight information to the second aircraft 110B.

In one embodiment, the second aircraft 110B may request in-flight tactical and strategic information relevant to the first aircraft 110A. The requested in-flight information provided in the A2A response message by the first aircraft 110A may include information obtained from one or more of the data sources 130A, 132A, 134A, 136A, 138A, 140A, 142A, 150A.

The second aircraft 110B must already know the proximate position, altitude and flight identity of the first aircraft 110A based on received ABS-B data. When in direct communication with the first aircraft 110A, as a proximate entity, the second aircraft 110B may generate and transmit a request message to obtain additional information from the first aircraft 110A relevant to the recent experiences of the first aircraft 110A. This additional information may include information related to experiences encountered during recent flight history, such as, for example, turbulence, weather (including weather radar images), wind speed, temperature, icing conditions, traffic, braking action and aircraft systems status. It should be appreciated that the second aircraft 110B may request any other generally known relevant information from the first aircraft 110A without departing from the scope of the present disclosure.

Figure 1B:
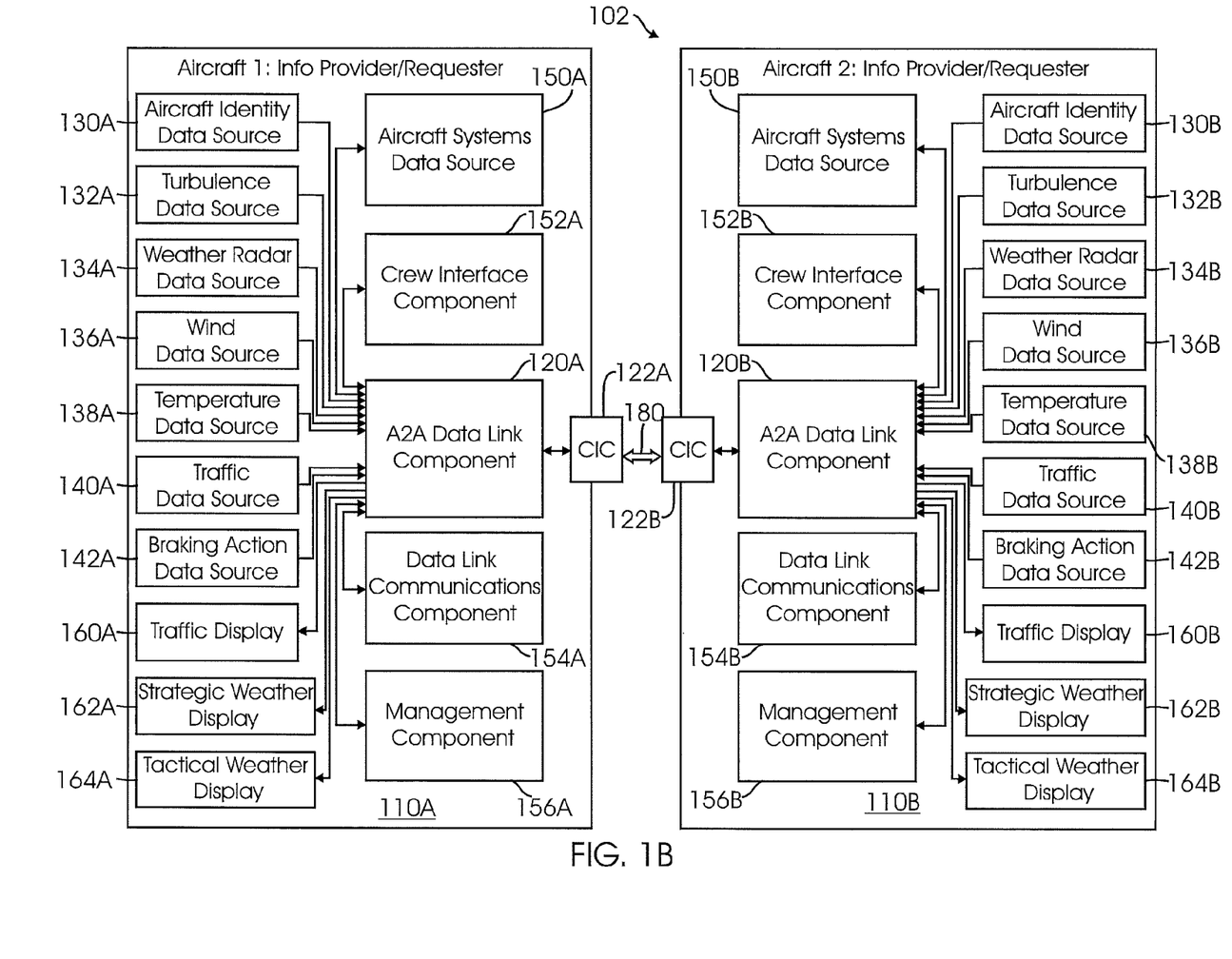

FIG. 1B shows a system 102 for direct aircraft-to-aircraft (A2A) communication in accordance with one embodiment of the present disclosure. As shown in FIG. 1B, the first and second aircraft 110A, 110B are equipped with each of the components discussed in reference to FIG. 1A. Therefore, each of the aircraft 110A and 110B is configured to function as an information provider and requestor. As such, the aircraft 110A, 110B may directly communicate with each other and transmit/receive A2A request/response messages for in-flight information via the communication link 180. It should be appreciated that the discussion above in reference to FIG. 1A including each of the components of aircraft 110A, 110B may be applied to FIG. 1B without departing from the scope of the present disclosure.

Referring to FIG. 1B, the first aircraft 110A comprises an A2A data link component 120A, a communication interface component (CIC) 122A and a plurality of data sources including a turbulence data source 132A, a weather radar data source 134A, a wind data source 136A, a temperature data source 138A, a traffic data source 140A, a braking action data source 142A, and an aircraft systems data source 150A. The first aircraft 110A further comprises a crew interface component 152A, a data link communications component 154A and a management component 156A. The first aircraft 110A further comprises a plurality of display components including a traffic display component 160A, a strategic weather display component 162A and a tactical weather display component 164A. It should be appreciated that each of these components may be equipped with similar scope and functionality as their respective counterparts as discussed in reference to FIG. 1A.

Similarly, referring to FIG. 1B, the second aircraft 110B comprises an A2A data link component 120B, a communication interface component (CIC) 122B and a plurality of data sources including a turbulence data source 132B, a weather radar data source 134B, a wind data source 136B, a temperature data source 138B, a traffic data source 140B and a braking action data source 142B, and an aircraft systems data source 150B. The second aircraft 110B further comprises a crew interface component 152B, a data link communications component 154B and a management component 156B. The second aircraft 110B further comprises a plurality of display components including a traffic display component 160B, a strategic weather display component 162B and a tactical weather display component 164B. It should be appreciated that each of these components may be equipped with similar scope and functionality as their respective counterparts as discussed in reference to FIG. 1A.

Figure 2A:
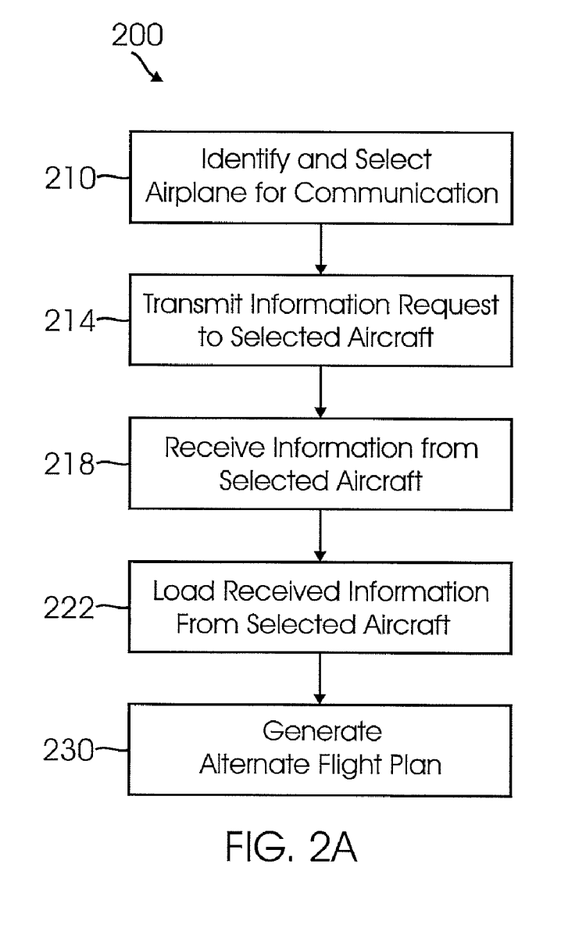
FIGS. 2A-2B show various embodiments of an aircraft-to-aircraft communication method.

FIG. 2A shows a method 200 for direct aircraft-to-aircraft (A2A) communication in accordance with one embodiment of the present disclosure. The method 200 enables direct communication between aircraft for improved situational awareness, flight planning and flight route efficiency.

Referring to FIG. 2A, the method 200 identifies and selects an aircraft of interest for direct communication. In one implementation, a flight crew may use CDTI to identify the aircraft of interest (block 210), select the aircraft for communication (block 210), and transmit an information request in a message format (e.g., text message) to the selected aircraft (block 214). In various implementations, the flight crew may provide a request for information from the selected aircraft via the crew interface component by, for example, filling out a standard template for a message (e.g., text message).

Next, the flight crew may receive a response message from the selected aircraft incorporating the requested information (block 218). After receiving the response message, the flight crew may load the requested information received from the selected aircraft in various avionics functions (block 222). The information received from the selected aircraft may include wind, turbulence, temperature, weather phenomena, runway braking action and aircraft systems data. Next, the flight crew may generate an alternate flight plan based on the received information (block 230).

In various implementations, the flight crew may identify an aircraft of interest on the traffic display, select the aircraft by picking it from a list of traffic aircraft displayed on a control display unit (CDU) using a cursor control device, using a touch screen, using a voice command or some other component in the flight deck. After selecting the aircraft of interest, the flight crew may send a message requesting tactical and/or strategic information that may be of use to improve flight planning or for some other purpose. The message may be transmitted on HF, VHF, ADS-B (i.e., as part of the broadcast data stream to the selected aircraft), ADS-C or any other communication medium. The systems and methods presented herein provide a flight crew an increased ability to acquire information for improved situation awareness (e.g., traffic, weather, etc.), which may improve flight planning including tactical flight planning, which may improve fuel efficiency, schedule efficiency and passenger ride comfort. The systems and methods also provide data that may be used by flight path prediction functions to increase the accuracy and resolution of the predictions being generated.

In various implementations, referring to FIG. 2A, the process 200 may be automatic, wherein the A2A data link component 120A of the first aircraft 110A, for example, may automatically sense a proximate in-flight aircraft, such as the second aircraft 110B, from the traffic display 160A, 160B and automatically generate and transmit a request message to the second aircraft 110B. If the second aircraft 110B transmits a response message, the A2A data link component 120A of the first aircraft 110A may automatically receive the message and load the receive information provided by the second aircraft 110B into various avionics functions. The A2A data link component 120A may then automatically generate and provide a proximity map and alternate flight plan information to the flight crew of the first aircraft 110A via the crew interface 152A and other avionics components.

Figure 2B:
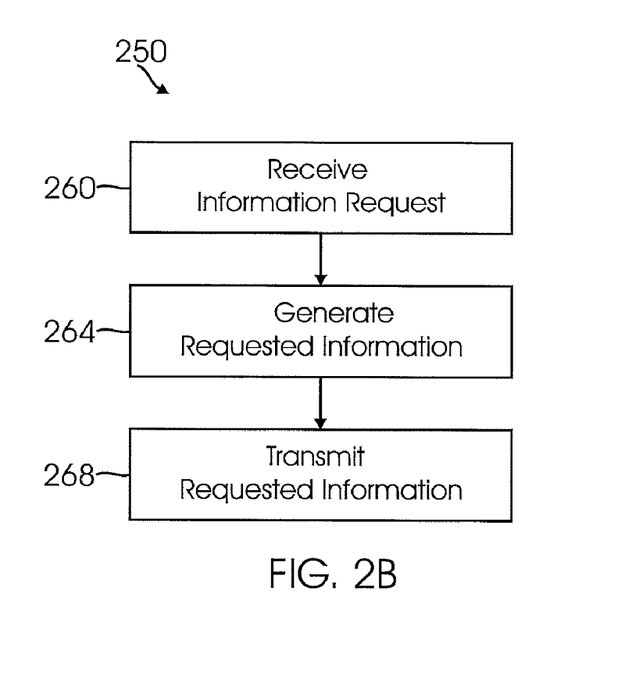

FIG. 2B shows a method 250 for direct aircraft-to-aircraft (A2A) communication in accordance with one embodiment of the present disclosure. As previously discussed, an aircraft (i.e., information requester) transmits a request message to another aircraft (i.e., information provider). Upon receiving an information request message (block 260), the information provider generates a response message with the requested information (block 264) and transmits the generated response message to the information requester (block 268). It should be appreciated that the information provider may ignore the request message and decline to provide the requested information to the information requester.

In various implementations, referring to FIG. 2B, the process 250 may be automatic, wherein the A2A data link component 120B of the second aircraft 110B, for example, may automatically sense and receive a request message from a proximate in-flight aircraft, such as the first aircraft 110A. For example, once the request message is received, the A2A data link component 120B of the second aircraft 110B may automatically generate the requested information in a response message and use the CIC 122B to automatically transmit the generated response message to the first aircraft 110A.

Figure 3:
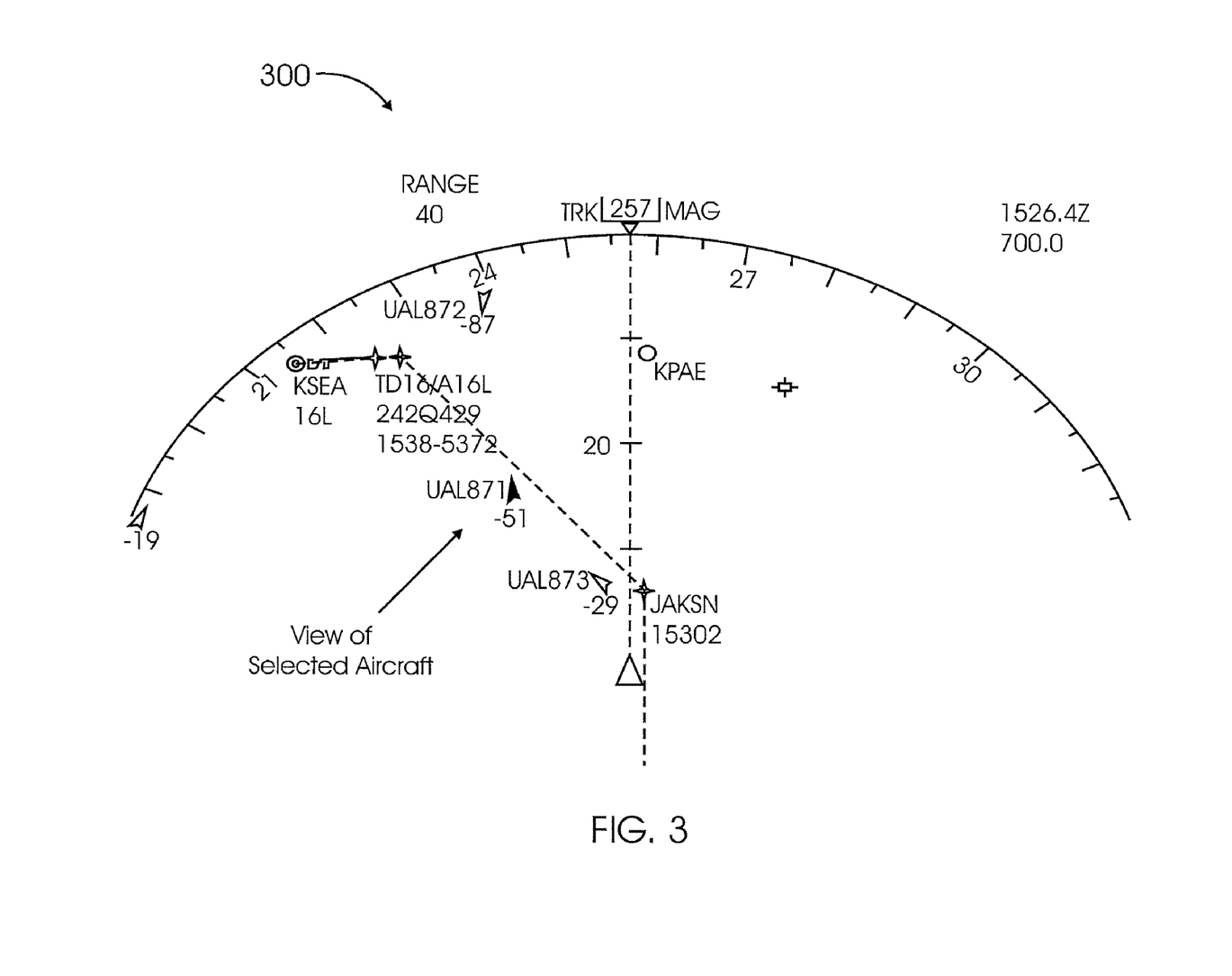
FIG. 3 shows one embodiment of a flight crew interface.

FIG. 3 shows one embodiment of a display 300 provided by the crew interface component 152A and/or 152B for viewing of in-flight tactical and strategic information related to in-flight proximate aircraft. FIG. 3 shows a view of a selected aircraft as an image, based on ADS-B data, which may be associated with information related to in-flight measurements obtained by the selected aircraft. In one example, the flight crew of the second aircraft 110B may identify and select the first aircraft 110A from the display as shown in FIG. 3.

Figure 4:
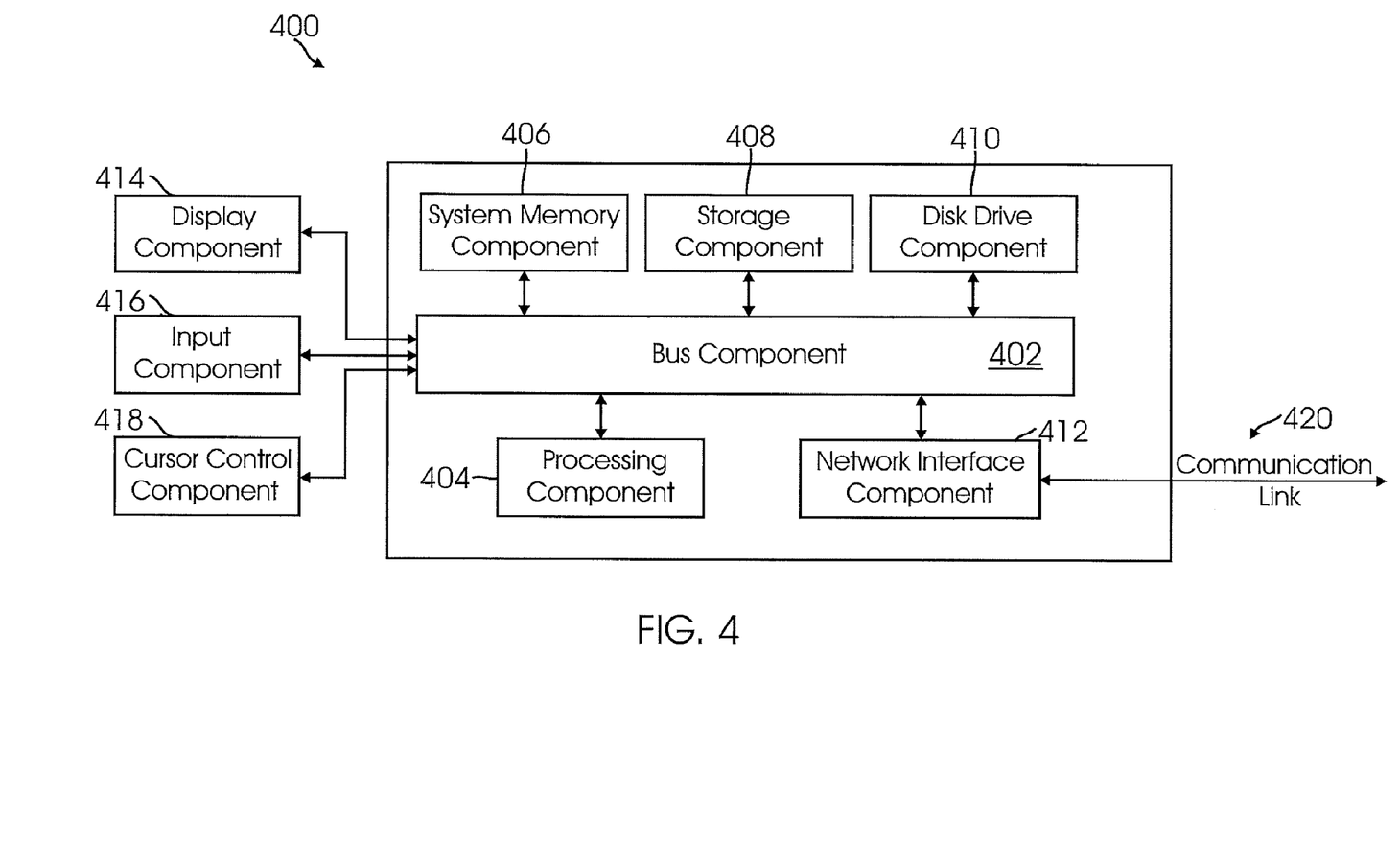
FIG. 4 shows one embodiment of a computer system.

FIG. 4 shows a block diagram of a computer system 400 suitable for implementing embodiments of the present disclosure. Computer system 400 includes a bus 402 or other communication mechanism for communicating information, which interconnects subsystems and components, such as processing component 404 (e.g., processor, micro-processor, micro-controller, digital signal processing (DSP) device), system memory component 406 (e.g., RAM), static storage component 408 (e.g., ROM), disk drive component 410 (e.g., magnetic or optical), network interface component 412 (e.g., modem, Ethernet card, wireless transceiver), display component 414 (e.g., CRT or LCD), input component 416 (e.g., keyboard), and cursor control component 418 (e.g., mouse or trackball).

In various embodiments, the previously discussed components of systems 100, 102 of FIGS. 1A, 1B, respectively, may be integrated as part of the computer system 400 of FIG. 4. For example, each of the aircraft 110A, 110B may comprise the computer system 400 adapted for use thereby, wherein the processing component 404 may be adapted for use as the data link component 120A, 120B, the crew interface components 152A, 152B may be adapted for use as a combination of the display component 414, the input component 416, and the cursor control component 418, and the communication interface components 122A, 122B may be adapted for use as the network interface component 412. The remaining components of systems 100, 102 may be linked to the data link components 120A, 120B via the bus component 412.

In accordance with embodiments of the disclosure, computer system 400 performs specific operations by processor 404 executing one or more sequences of one or more instructions contained in system memory component 406. Such instructions may be read into system memory component 406 from another computer readable medium, such as static storage component 408 or disk drive component 410. In other embodiments, hard-wired circuitry may be used in place of or in combination with software instructions to implement the disclosure.

Logic may be encoded in a computer readable medium, which may refer to any medium that participates in providing instructions to processor 404 for execution. Such a medium may take many forms, including but not limited to, non-volatile media, volatile media, and transmission media. In various implementations, non-volatile media includes optical or magnetic disks, such as disk drive component 410, volatile media includes dynamic memory, such as system memory component 406, and transmission media includes coaxial cables, copper wire, and fiber optics, including wires that comprise bus 402. In one example, transmission media may take the form of acoustic or light waves, such as those generated during radio wave and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read.

In various embodiments of the disclosure, execution of instruction sequences to practice the disclosure may be performed by computer system 400. In various other embodiments of the disclosure, a plurality of computer systems 400 coupled by communication link 420 (e.g., LAN, wireless LAN, wireless network) may perform instruction sequences to practice the disclosure in coordination with one another.

Computer system 400 may transmit and receive messages, data, information and instructions, including one or more programs (i.e., application code) through communication link 420 and network interface component 412. Received program code may be executed by processor 404 as received and/or stored in disk drive component 410 or some other non-volatile storage component for execution.

Where applicable, various embodiments of the disclosure may be implemented using hardware, software, or various combinations of hardware and software. Where applicable, various hardware components and/or software components set forth herein may be combined into composite components comprising software, hardware, and/or both without departing from the scope and functionality of the present disclosure. Where applicable, various hardware components and/or software components set forth herein may be separated into subcomponents having software, hardware, and/or both without departing from the scope and functionality of the present disclosure. Where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more general purpose or specific purpose computers and/or computer systems, networked and/or otherwise. Where applicable, ordering of various steps described herein may be changed, combined into composite steps, and/or separated into sub-steps to provide features described herein.

Embodiments described herein illustrate but do not limit the disclosure. It should also be understood that numerous modifications and variations are possible in accordance with the principles of the present disclosure. Accordingly, the scope of the disclosure is defined only by the following claims.

We claim:

1. A system for a first aircraft comprising:
   a data link component adapted to process information;
   a storage component adapted to store information related to the first aircraft;
   a communication interface component adapted to directly communicate with one or more proximate aircraft via a communication link; and
   a user interface component adapted to interact with the data link component to:
   identify and display one or more proximate aircraft;
   receive a first user input to select at least one of the proximate aircraft for communication therewith;
   retrieve information related to the first aircraft from the storage component;
   receive a second user input to generate a request text message for the selected proximate aircraft, the request text message requesting tactical information from the selected proximate aircraft, the request text message including information related to the first aircraft; and
   communicate with the communication interface component to directly transmit the generated request text message to the selected proximate aircraft via the communication link.

2. The system of claim 1, further comprising a plurality of data sources that generate in-flight information related to the first aircraft, wherein the generated information is stored in the storage component.

3. The system of claim 2, wherein the plurality of data sources include at least one of an aircraft identity data source, a turbulence data source, a weather radar data source, a wind data source, a temperature data source, a traffic data source, a braking action data source, and an aircraft systems data source.

4. The system of claim 1, wherein the information related to the first aircraft includes identification information of the first aircraft.

5. The system of claim 1, wherein the communication link comprises a radio frequency (RF) communication link.

6. The system of claim 1, wherein the request text message comprises a text message that includes information selected by the user from a list of tactical information available for transmission.

7. The system of claim 1, wherein the communication interface component is adapted to receive a response text message from the selected proximate aircraft in response to the request text message.

8. The system of claim 7, wherein the response text message comprises information related to the selected proximate aircraft including identification information related to the selected proximate aircraft.

9. The system of claim 7, wherein the response text message comprises a text message that includes tactical information related to the selected proximate aircraft.

10. The system of claim 1, wherein the user interface component comprises a display component adapted to display one or more of the proximate aircraft as in-flight traffic including an image of the selected proximate aircraft.

11. The system of claim 10, wherein the display component is adapted to comprise at least one of a traffic display, a strategic weather display, a tactical weather display, and a display element of a flight management function.

12. A method adapted for use by a first aircraft, the method comprising:
   identifying one or more in-flight aircraft;
   displaying the one or more identified in-flight aircraft to a user of the first aircraft;
   receiving a first user input from the user for selecting at least one of the identified in-flight aircraft for communication therewith;
   receiving a second user input from the user to generate a request message for the selected in-flight aircraft, the request message comprising a text message inputted by the user that requests information from the selected in-flight aircraft;
   transmitting the request text message for information directly to the selected in-flight aircraft via a communication link; and
   receiving the requested information in a response message directly from the selected in-flight aircraft via the communication link, the response message comprising a text message that includes the requested information related to the selected in-flight aircraft.

13. The method of claim 12, further comprising storing information received from the selected in-flight aircraft including the requested information.

14. The method of claim 12, further comprising receiving a third user input from the user for generating an alternate flight plan based on information received from the selected in-flight aircraft including the requested information.

15. The method of claim 12, wherein transmitting the request text message for information comprises transmitting a text message to the selected in-flight aircraft that includes information selected by the user from a list of tactical information available for transmission.

16. The method of claim 12, wherein receiving the requested information from the selected in-flight aircraft comprises receiving a text message from the selected in-flight aircraft as a response to the request text message for information.

17. Software encoded in one or more computer readable media and when executed by a processor operable to provide a first in-flight aircraft the capability to communicate with one or more other in-flight aircraft, the software further operable to:
   identify the one or more other in-flight aircraft;
   display the one or more identified in-flight aircraft to a user of the first aircraft;
   receive a first user input from the user to select at least one of the identified in-flight aircraft for communication therewith;
   receive a second user input from the user to generate a request message for the selected in-flight aircraft, the request message comprising message inputted by the user that requests information from the selected in-flight aircraft;

transmit the request text message for information directly to the selected in-flight aircraft via a communication link; and receive the requested information in a response message directly from the selected in-flight aircraft via the communication link, the response message comprising a text message that includes the requested information related to the selected in-flight aircraft.

18. The software of claim 17, further operable to store information received from the selected in-flight aircraft including the requested information.

19. The software of claim 17, further operable to receive a third user input from the user to generate an alternate flight plan based on information received from the selected in-flight aircraft including the requested information.

20. The software of claim 17, wherein being operable to transmit the request text message for information comprises being operable to transmit a text message directly to the selected in-flight aircraft as a request for tactical information related to the selected in-flight aircraft, and wherein being operable to receive the requested information in a response message comprises being operable to receive a text message directly from the selected in-flight aircraft as a response to the request text message for tactical information related to the selected in-flight aircraft.

* * * * *